March 2, 1948. L. S. KASSEL 2,436,927
PREVENTION OF AFTERBURNING IN FLUIDIZED CATALYTIC CRACKING PROCESSES
Filed Nov. 29, 1943
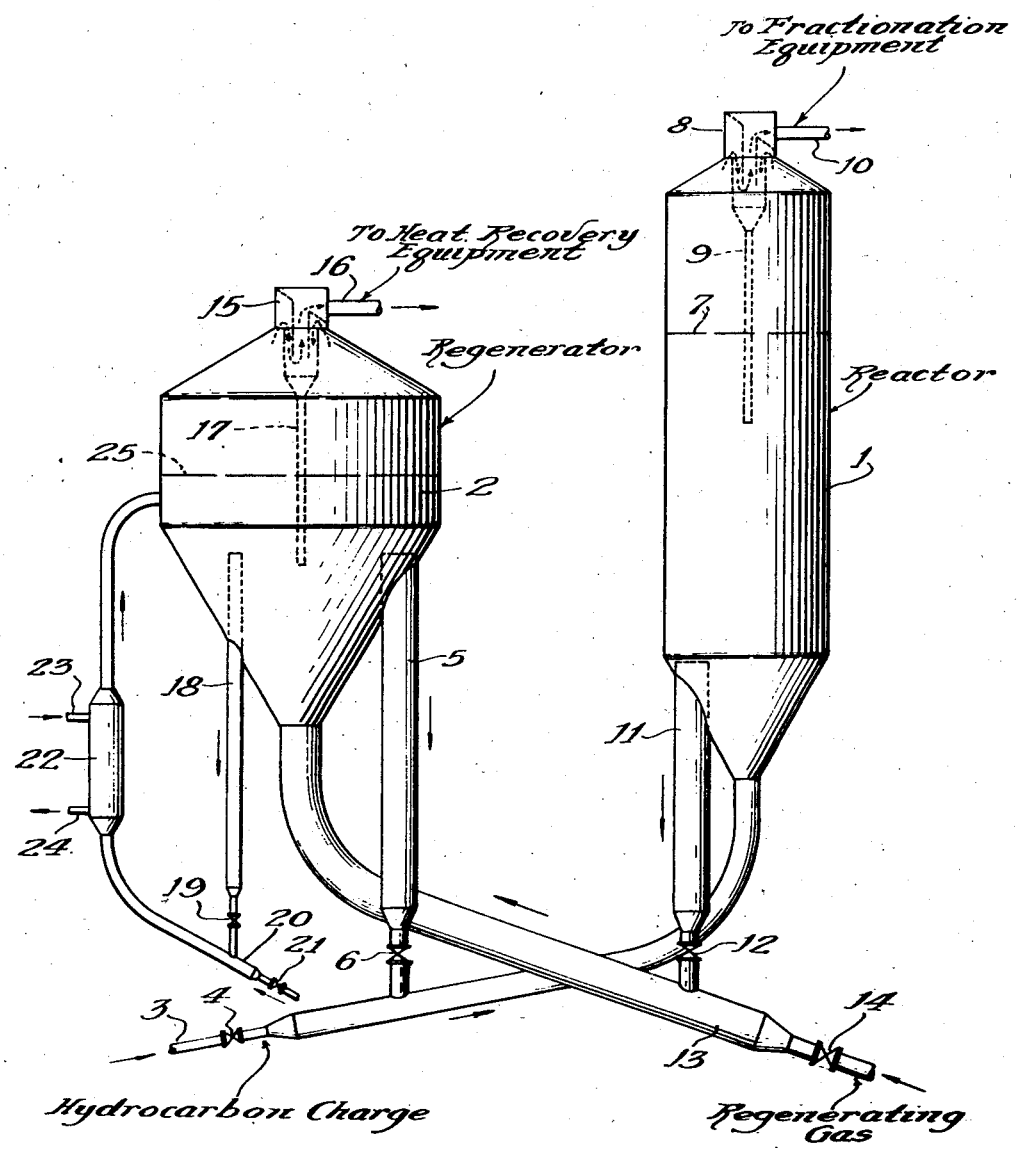
Inventor:
Louis S. Kassel
By: Lee J. Gary
Attorney Patented Mar. 2, 1948

2,436,927

UNITED STATES PATENT OFFICE 2,436,927

PREVENTION OF AFTERBURNING IN FLUIDIZED CATALYTIC CRACKING PROCESSES

Louis S. Kassel, Riverside, Ill., assignor to Universal Oil Products Company, Chicago, Ill., a corporation of Delaware Application November 29, 1943, Serial No. 512,116

8 Claims. (Cl. 196—52)

This invention relates to an improvement in catalytic conversion processes and more particularly to the so-called "fluidized" catalytic conversion processes in which hydrocarbons, boiling within the gasoline range or higher, are contacted with silica-alumina type catalysts for the purpose of producing high quality gasoline.

More specifically my invention is concerned with a method of preventing the occurrence of "afterburning" in "fluidized" catalyst conversion plants. "Afterburning" is a phenomenon which has been observed to take place in "fluidized" catalyst regenerators. It has occurred in the light phase in the regenerator and in the cyclones and exit ducts. When this "afterburning" takes place, local zones of extremely high temperatures occur and any catalyst particles within these local zones are excessively heated and rendered relatively inactive for the cracking process.

In the "fluidized" catalyst cracking process, finely divided catalyst particles of a size ranging between about 10 and 400 microns are ordinarily employed. During the operation of the process a considerable portion of the catalyst particles enters the light phase in the regenerator although the residence time of such particles in this zone is of very short duration. It has been observed, when using glass experimental units, that when "afterburning" occurs, these catalyst particles reach incandescence which indicates that a very high temperature of the order of 2000° F. or higher is reached. Also, it has been found by extensive experimentation that when cracking catalysts are subjected to temperatures above about 1400° F., their activity is considerably reduced and that when subjected to temperatures very much in excess of 1400° F., the catalyst's activity is practically destroyed for the cracking reaction.

Although I do not know the exact reasons for the catalyst's loss of activity when it is subjected to high temperatures, I believe it may be caused by the following facts concerning physical characteristics of the components which go to make up the catalyst composite and the composite itself. It is known that the apparent bulk density of the catalyst is related to its activity. It is also known that upon heating to excessive temperatures, the apparent bulk density of the catalyst is increased. This increase in apparent bulk density, it is presumed, results from fusion and loss in porosity of the catalyst particles. It, therefore, follows that high temperatures of the order of those which the catalyst particles attain when subjected to "afterburning" may render the catalyst inactive because of its loss in porosity. At any rate, whether or not the above reason may cause the catalyst's loss of activity, I have observed a decidedly greater loss of catalyst activity when "afterburning" is allowed to occur than is the case when "afterburning" is prevented.

I have found that "afterburning" takes place when combustible mixtures of oxygen and carbon monoxide at the temperatures within the regenerator are present in the light phase. My invention, therefore, is concerned with a method of preventing "afterburning" by eliminating the possibility of combustible mixtures of oxygen and carbon monoxide occurring in the light phase zone of the regenerator.

Briefly, my invention comprises including a carbon monoxide oxidizing catalyst with the cracking catalyst employed in fluidized catalytic cracking processes. I have found that extremely small proportions of the carbon monoxide oxidizing catalyst will function to satisfactorily eliminate "afterburning." Also, that when the carbon monoxide oxidizing catalyst is included with the cracking catalyst and used for the cracking reaction, substantially no detrimental effect occurs.

As catalysts for the oxidation of carbon monoxide, metals or compounds, particularly the oxides of metals from the first transition series of the periodic table comprising copper, chromium, manganese, cobalt and nickel may be employed. These metals or metal compounds may be included as a component of the cracking catalyst by co-precipitation therewith or by impregnating with an aqueous solution of a thermally decomposable salt and heating to dry and decompose the salt or preferably the carbon monoxide oxidizing catalyst may comprise one of the above mentioned oxides supported on a suitable carrier. In the latter case, physical mixtures of cracking catalyst particles and supported carbon monoxide oxidizing catalyst particles are to be employed in the process.

The carbon monoxide oxidizing catalyst, I have found, may comprise a very small proportion of the total catalyst used in the cracking process. For example, when using cobalt, percentages by weight based on the total catalyst of from about 0.0005 to about 0.01% have satisfactorily prevented "afterburning" with substantially no harmful effects in the cracking reaction. The other carbon monoxide oxidizing catalysts may be used in similar proportions although not necessarily with equivalent results.

In order to make the invention more clearly understood, and to illustrate the features and advantages which are obtainable by its use, reference is made to the accompanying diagrammatic drawing and the following description thereof.

The drawing shows a typical fluidized catalyst plant in which 1 designates the reactor and 2, the regenerator.

The operation of the plant is as follows. A hydrocarbon oil charge is introduced through line 3 controlled by valve 4 and is admixed with regenerated catalyst withdrawn from the regenerator through line 5 controlled by valve 6. The hydrocarbon charge may be introduced either as a vapor or a liquid. If the latter, the solid catalyst admixed therewith contains sufficient heat to vaporize the charge. The vapors and catalyst then pass into reactor 1 wherein the upward velocity of the vapors is insufficient to overcome the effect of gravity on the catalyst particles and a relatively dense phase of high catalyst concentration is formed. The upper extent of this dense phase will be governed by the catalyst inventory which is held in the reactor and is indicated by broken line 7. Above the interface indicated by line 7 is a relatively light phase of low catalyst concentration wherefrom the vapors and entrained catalyst particles are removed and passed through separating equipment 8 wherein the catalyst fines are removed from the stream of effluent reaction products, the catalyst being returned to the dense phase through line 9 and the reaction products being directed to suitable fractionation or recovery equipment through line 10.

During the cracking reaction, the catalyst in the reactor accumulates a deleterious deposit of carbonaceous material which must be removed in order that the catalyst be maintained effective for the cracking reaction. Therefore, a continuous stream of contaminated catalyst is withdrawn from the reactor through line 11 controlled by valve 12 and admixed in line 13 with oxygen-containing regenerating gas controlled by valve 14. The regenerating gas-catalyst mixture is then directed into regenerator 2 wherein a dense phase-light phase condition similar to that which occurs in the reactor is effected. The oxygen in the regenerating gas effects the removal of carbonaceous material from the catalyst by burning in the regenerator and the combustion products, after being separated from entrained fines in separating equipment 15, are removed to suitable heat recovery equipment by means of line 16. The separated fines are returned to the dense phase in the regenerator by means of line 17. The reactivated catalyst is withdrawn from the regenerator by means of line 5 and admixed with the charging material as previously described.

In order to prevent excessive temperature rises in the regenerator, a quantity of catalyst is continually withdrawn through line 18 controlled by valve 19 and admixed with a carrier gas, which may be a quantity of regenerating gas, in line 20 controlled by valve 21. The mixture of catalyst and gas then passes through heat exchanger 22 wherein its temperature is lowered and the cooled catalyst is then directed back into the regenerator. Any desired cooling medium may be used in heat exchanger 22 such as a portion of the charging stock and this cooling material may be introduced through line 23 and withdrawn through line 24.

The "afterburning" phenomenon which I propose to eliminate by the use of my invention occurs above the interface indicated by broken line 25 in the regenerator and is thought to be caused by the combustion of oxygen and carbon monoxide at the relatively high temperatures which are maintained therein. These temperatures are ordinarily of the order of about 1025° F. up to about 1250° F. When employing my invention, I have found that "afterburning" is eliminated due to the fact that substantially no mixtures of oxygen and carbon monoxide occur in the exit gases leaving the dense phase in the regenerator.

My invention is also advantageous when applied to "fluidized" processes wherein the catalyst is not transferred from one vessel to another, but is processed and regenerated in situ. Also, it is advantageous when applied to processes wherein only the regeneration zone is maintained in "fluidized" condition.

The term "fluidized" as employed in this specification and appended claims is intended to mean, when applied to a catalyst mass, a condition of said catalyst which is brought about by upwardly flowing gases or vapors and which gives the catalyst mass the appearance of a boiling liquid.

It has been stated that catalysts of the type which I propose, especially those containing copper, cobalt or nickel, have detrimental effects on the cracking reaction. I have found, however, that even amounts greater than those I propose to use do not seriously affect the cracking reaction. This can be pointed out by reference to the following example.

In the first two tests tabulated below, a Mid-Continent gas oil was passed over a cracking catalyst without any added carbon monoxide oxidizing catalyst and in test #3 the same gas oil was passed over the same cracking catalyst to which had been added a carbon monoxide oxidizing catalyst containing cobalt. The percentage of cobalt by weight on the catalyst as a whole was .0125%.

| Test | 1 | 2 | 3 |
|---|---|---|---|
| Weight Hourly Space Velocity | 0.51 | .51 | .50 |
| Catalyst to Oil Ratio | 3.9 | 4.0 | 4.0 |
| Pressure, Abs., Lbs./Sq. In | 14.7 | 14.7 | 14.7 |
| Temperature, °F | 850 | 850 | 850 |
| Ylds. (100 Wt. Per Cent Recovery Basis): | | | |
| Gasoline, Wt. Per Cent Charge | 37.8 | 34.8 | 37.7 |
| Naphtha, Wt. Per Cent Charge | 3.2 | 2.6 | 3.6 |
| Gas Oil, Wt. Per Cent Charge | 16.0 | 18.2 | 17.6 |
| Gas, Wt. Per Cent Charge | 28.7 | 30.2 | 27.9 |
| Carbon, Wt. Per Cent Charge | 14.3 | 14.2 | 13.2 |
| Loss Basis Charge | 7.3 | 10.8 | 8.1 |
| $H_2$ Wt. Per Cent Charge | .12 | .28 | .23 |
| $C_2H_4$ Wt. Per Cent Charge | .63 | .20 | .67 |
| $C_3H_6$ Wt. Per Cent Charge | 2.40 | 3.41 | 2.74 |
| $C_1+C_2+C_3$ Paraffins, Wt. Per Cent Charge | 8.74 | 9.62 | 8.66 |
| Gasoline Gravity, °API | 66.5 | 65.3 | 65.4 |
| Bromine Number | 11 | 11 | 11 |
| PONA Analysis: | | | |
| Per Cent Olefins | 6 | 6 | 6 |
| Per Cent Aromatics | 32 | 34 | 26 |
| Per Cent Paraffins and Naphthenes | 62 | 60 | 68 |

In addition, the octane number of the gasoline products of the three tests were substantially the same.

It is readily apparent from the above tabulated data that substantially no detrimental effect can be observed from the addition of the carbon monoxide oxidizing catalyst to the cracking catalyst when used in the cracking reaction. There was no excessive production of gas or carbon for example.

I claim as my invention:

1. In the regeneration of subdivided silica-alumina catalyst particles contaminated with a combustible deposit wherein the catalyst is regenerated by passing an oxygen-containing gas upwardly through a mass of the contaminated particles in a regeneration zone at a rate regulated to form a lower dense phase of relatively high particle concentration and an upper light phase of reduced particle concentration and said deposit is burned in said dense phase, the method of preventing "afterburning" in said light phase which comprises subjecting to said regeneration a physical mixture of discrete particles of said silica-alumina catalyst with discrete particles of a supported carbon monoxide oxidizing catalyst comprising a metal selected from the group consisting of copper, chromium, manganese, cobalt and nickel, said discrete particles of carbon monoxide oxidizing catalyst comprising from about 0.0005 to about 0.01 percent by weight of the total catalyst mixture.

2. In a catalytic conversion process employing subdivided silica-alumina catalyst particles wherein said particles become contaminated with a combustible deposit, regeneration of the contaminated catalyst is effected by passing an oxygen-containing gas upwardly through a mass of the contaminated catalyst particles in a regeneration zone at a flow rate regulated to form a lower dense fluidized catalyst phase resembling a boiling liquid and an upper light phase of reduced catalyst particle concentration, said deposit is burned from the catalyst in said dense phase, and resultant combustion gases are discharged from said light phase, the method of preventing the formation of combustible mixtures of carbon monoxide and oxygen in said light phase which comprises employing in said conversion process and in said regeneration step a physical mixture of discrete particles of said silica-alumina catalyst with discrete particles of a supported carbon monoxide oxidizing catalyst comprising a metal selected from the group consisting of copper, chromium, manganese, cobalt and nickel, said discrete particles of carbon monoxide oxidizing catalyst comprising from about 0.0005 to about 0.01 percent by weight of the total catalyst mixture.

3. The method of claim 1 further characterized in that said carbon monoxide oxidizing catalyst comprises an oxide of copper.

4. The method of claim 1 further characterized in that said carbon monoxide oxidizing catalyst comprises an oxide of manganese.

5. The method of claim 1 further characterized in that said carbon monoxide oxidizing catalyst comprises an oxide of cobalt.

6. The method of claim 2 further characterized in that said carbon monoxide oxidizing catalyst comprises an oxide of copper.

7. The method of claim 2 further characterized in that said carbon monoxide oxidizing catalyst comprises an oxide of manganese.

8. The method of claim 2 further characterized in that said carbon monoxide oxidizing catalyst comprises an oxide of cobalt.

LOUIS S. KASSEL.

REFERENCES CITED

The following references are of record in the file of this patent:

UNITED STATES PATENTS

| Number | Name | Date |
|---|---|---|
| 2,078,951 | Houdry | May 4, 1937 |
| 2,246,654 | Arveson | June 24, 1941 |
| 2,271,148 | Becker et al. | Jan. 27, 1942 |
| 2,315,107 | Chickinoff et al. | Mar. 30, 1943 |
| 2,322,070 | Stratford et al. | June 15, 1943 |
| 2,324,165 | Layng et al. | July 13, 1943 |
| 2,326,705 | Thiele et al. | Aug. 10, 1943 |
| 2,327,175 | Conn | Aug. 17, 1943 |
| 2,342,856 | Hall | Feb. 29, 1944 |
| 2,372,165 | Arveson | Mar. 20, 1945 |
| 2,387,798 | Kubicek et al. | Oct. 30, 1945 |

FOREIGN PATENTS

| Number | Country | Date |
|---|---|---|
| 498,094 | Great Britain | Jan. 3, 1939 |

OTHER REFERENCES

Berkman et al., "Catalysis," published, 1940, by Reinhold Publishing Co., N. Y. C., pages 775–779.

Dunstan et al., "Science of Petroleum," 1938, Oxford University Press, N. Y. C., vol. III, page 1700.